April 14, 1953      M. L. CRIPE      2,634,622
TRANSMISSION CONTROL MECHANISM

Filed Oct. 7, 1949      2 SHEETS—SHEET 1

INVENTOR.
MAXWELL L. CRIPE
BY
*H. O. Clayton*
ATTORNEY

INVENTOR.
MAXWELL L. CRIPE
BY
H V Clayton
ATTORNEY

Patented Apr. 14, 1953

2,634,622

UNITED STATES PATENT OFFICE 2,634,622

TRANSMISSION CONTROL MECHANISM

Maxwell L. Cripe, South Bend, Ind., assignor to Bendix Aviation Corporation, South Bend, Ind., a corporation of Delaware Application October 7, 1949, Serial No. 120,175

13 Claims. (Cl. 74—335)

1

This invention relates to power actuated mechanisms for selectively moving a control element to one or the other of two operative positions, and more particularly to gear shifting mechanisms for operating the speed changing gearing commonly used in coupling the engine or prime mover with the driving wheels or the like of an automotive vehicle or the propeller of a marine craft.

One of the objects of my invention is to provide a power shifting mechanism for motor vehicle change speed mechanism, that is, electrically selective under the control of the driver.

A further object of the invention is to provide a compact, easily serviced, and relatively simple double acting electrically operated power unit well adapted for use in mechanism for operating the shiftable elements of the two speed axle structure of an automotive vehicle; and also well adapted to take the place of certain of the vacuum operated power units of the day now being used as a part of said mechanism.

Yet another object of my invention is to provide a double acting power unit, adapted for use in mechanism for operating the shiftable elements of the two speed axle structure of an automotive vehicle, including yieldable means connectible with the axle structure said means comprising two yieldable members of different strengths one of said members serving to effect a neutralization of the axle structure and the other member serving, by virtue of its relatively low factor of strength, to effect a quiet meshing of gears or equivalent members of said structure.

The other objects of the invention will appear more fully hereinafter from a consideration of the following description taken in connection with the accompanying drawings where one embodiment of the invention is illustrated by way of example.

The transmission operating power means constituting my invention is preferably employed to operate a two speed axle transmission mechanism of an automotive vehicle; however, it may be employed to operate any power transmitting mechanism of the power plant of a land or marine vehicle wherein said mechanism is selectively movable to two operative positions.

Figure 1:
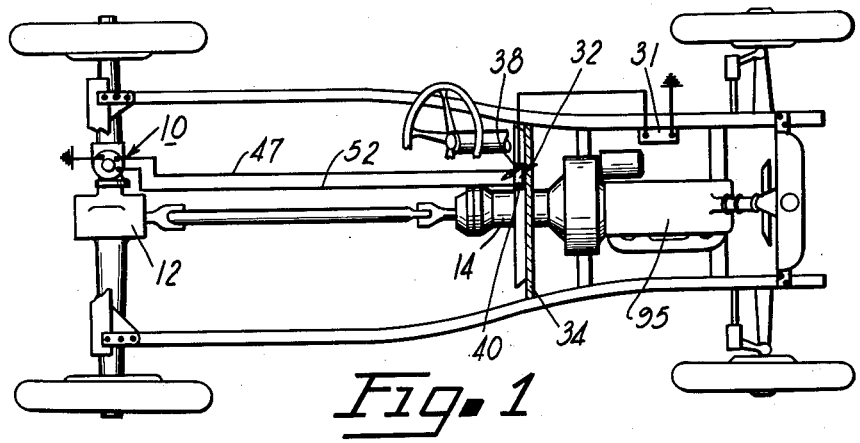
Figure 1 is a diagrammatic view of parts of an automotive vehicle embodying the transmission operating mechanism of my invention.

Referring to Figure 1 a transmission operating power unit 10 is detachably mounted on the carrier of what is known in the automotive art as a two speed axle, that is a part of the driving mechanism of the vehicle effecting a gear ratio in addition to the usual driving ratio and different therefrom. This two speed axle mechanism, actuated by the shifter mechanism of my invention, is indicated by the reference numeral 12 and a change speed transmission mechanism cooperating therewith is indicated by the reference numeral 14. The transmission operating mechanism constituting my invention may be employed to operate a Maybach clutch type of two speed axle, however, any other well known two speed axle construction is equally well operated by the mechanism of my invention.

Figure 2:
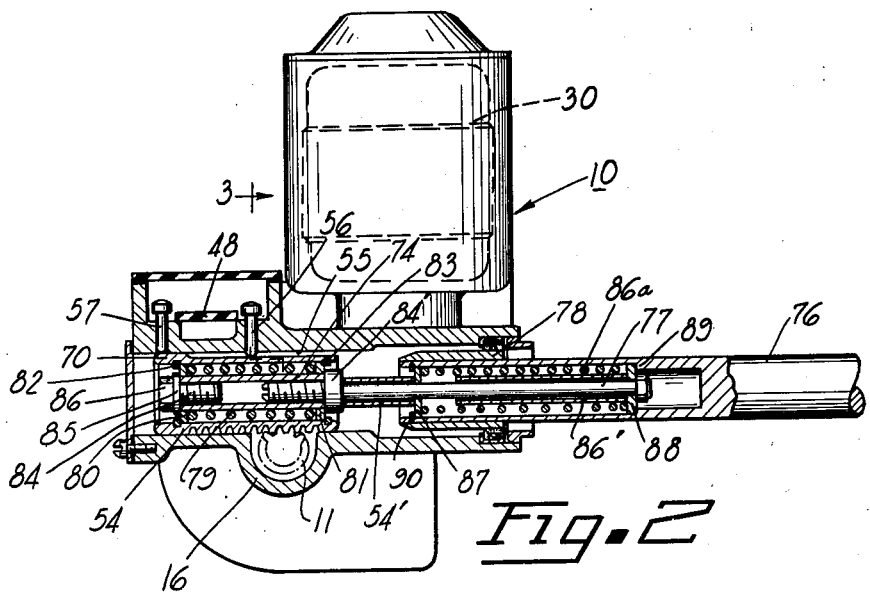
Figure 2 is a view, largely in section and taken on the line 2—2 of Figure 3, disclosing details of a preferred embodiment of the power unit of my invention.
Figure 3:
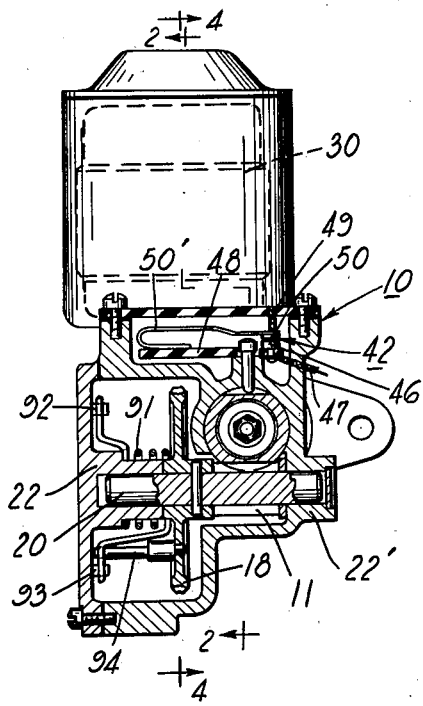
Figure 3 is a sectional view, taken on the line 3—3 of Figure 2, disclosing other details of the power unit of my invention.
Figure 4:
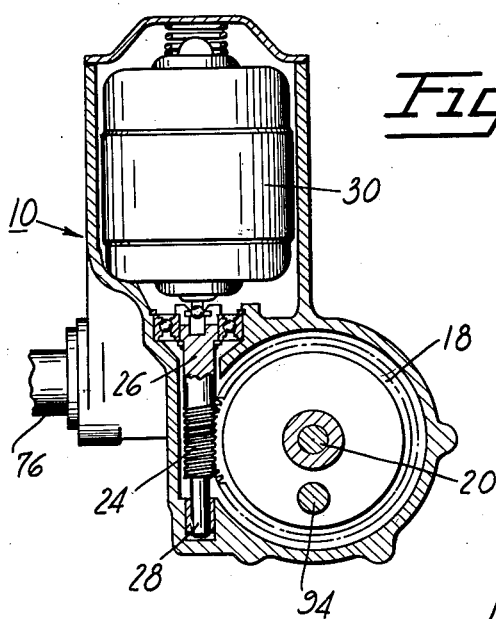
Figure 4 is a sectional view taken on the line 4—4 of Figure 3 disclosing the stop means of the power unit of my invention.

There is disclosed, in Figures 2 to 4 inclusive, a preferred embodiment of the power unit 10 of the transmission operating mechanism of Figure 1, said unit constituting an important feature of my invention. Describing this unit a casing 16 is shaped to receive a worm gear 18 drivably mounted upon a shaft 20 journalled in bosses 22 and 22' constituting a part of the casing. The worm gear is driven by a worm 24 drivably connected to a shaft 26; and this shaft is rotatably mounted, at its lower end 28, in the base of the unit. At its upper end the shaft 26 is preferably drivably connected to the shaft of a double field reversible electric motor 30 of a well known design.

As is disclosed in Figures 1, 2, and 3 the motor 30, which is grounded may be controlled by electrical means including a manually operated single pole double throw selector switch 32 conveniently mounted on the control panel 34 within the driver's compartment of the vehicle. The movable contact of the switch 32 may be electrically connected to a grounded battery 31; and fixed contacts 38 and 40 of said switch are electrically connected, respectively, to a motor operated cut out switch 42 and a motor operated cut out switch of duplicate constructions, but undisclosed, positioned alongside the switch 42. The latter switch preferably includes a fixed contact 46 electrically connected, by a conductor 47, to the contact 38 of the switch 32; and the contact 46 is preferably mounted upon a plate 48 secured to the motor casing 16. The switch 42 also includes a movable contact 50, mounted upon a flexible support 50' secured to the plate 48; and the contact 50 is electrically connected, by a conductor 49, to one of the field windings of the motor 30. The aforementioned undisclosed switch, being a duplicate of the switch 42, is not described in detail herein. Suffice it to say that the movable contact of said switch is mounted upon a flexible support member secured to the plate 48; and said movable contact is electrically connected to the other of the field windings of the grounded motor 30. The fixed contact, not shown, of the undisclosed switch is electrically connected, by means including a conductor 52, Figure 1, to the contact 40 of the selector switch 32.

Completing the description of the motor cut out switches the movable contacts thereof are biased into engagement with the fixed contacts of the switches. The means for operating the switch 42 and its companion switch positioned alongside thereof includes a cam 70, Figure 2, secured to an end portion of a cylindrically shaped rack member 54 slidably mounted within the casing 16. The outer surface of the rack 54 is provided with a groove 55 to receive a switch operating pin 56 and a switch operating pin 57; and as will be apparent from an inspection of Figure 2, lengthwise movement of the rack 54 serves, by the operation of the cam 70, to operate the switch 42 and the duplicate switch alongside thereof. The rack is moved to the right or left, Figure 2, by means of a pinion 11 meshing therewith said pinion, as disclosed in Figure 3, preferably being integrally connected to the shaft 20.

Describing now one of the important features of my invention, that is, the double acting yieldable force transmitting means interconnecting the motor driven worm gear 18 and the two speed axle mechanism 12, a shifting fork, not shown, within the latter mechanism is yieldingly connected to the worm gear 18 by means including a hollow rod 76. The latter member is connected at one of its ends to the aforementioned shifting fork of the two speed axle mechanism, and within the hollowed out portion of its other end receives a connecting rod 77. The latter end of the rod 76 is slidably mounted within a thimble member 78 which fits tightly within the motor casing; and when so mounted the thimble and rod become a part of the motor unit 10. The inner end of the rod 77 is threadedly mounted within a tubular thrust member 74 which is received within the rack member 54. A spring 79, sleeved over the thrust member 74 and within the rack 54, is compressed between thrust washers 80 and 81. The washer 80 abuts a locking ring 82 secured to the rack 54 and preferably abuts a thrust washer 85; and the washer 81 preferably abuts a flange 84' extending from and secured to the rod 77 and also abuts a locking ring 83 secured to the rack 54. A sleeve 54' is interposed between the flange 84' and a thrust washer 87. A bolt 84 is threaded within the thrust member 74; and the thrust washer 85, sleeved over said bolt and interposed between a head portion 86 thereof and the washer 80 serves as a force transmitting member when the rack 54 is moved to the left, Figure 2.

Completing the description of the connection between the worm gear 18 and the shifting fork of the transmission, a spring 86a, sleeved over a tubular shaped stop member 86', is compressed between thrust washers 87 and 88 the latter member abutting a shoulder 89 of the rod 76 and the washer 87 abutting a locking ring 90 embedded within one end of the rod 76. The spring 86a is preferably weaker than the spring 79 and the parts of the transmission operating mechanism of my invention are preferably so constructed and arranged that the springs 79 and 86a are preloaded, that is, they are compressed when the mechanism is in its off, that is, transmission meshed position.

Describing now the means for stopping the movement of the rack 54 after the motor 30 is cut off there is provided a preloaded coil spring 91, Figure 3, which is sleeved over the boss 22. One end of the spring rests upon a boss 92 secured to a wall portion of the casing 16; and the other end of the spring rests upon a boss 93 also secured to a wall portion of said casing. A pin 94, secured to the worm gear 18, contacts one or the other of the ends of the spring depending upon the direction of rotation of the gear, said spring serving to brake the rotation of the gear and bring the same to a stop. Preferably the parts of the mechanism are so constructed and arranged and so operative as to cut off the motor so as to limit the degree of compression of the spring 79; as to the compression of the spring 86a this operation is limited by the operation of the stop 86'.

Describing now the complete operation of the transmission operating mechanism disclosed in Figures 1 to 4, inclusive, it will be assumed that the vehicle is under way with the two speed axle mechanism 12 established in its low gear setting; and it will also be assumed when so established the parts of the mechanism assume the positions disclosed in the several figures of the drawings. In this position of the parts the motor cut off switch 42 is closed, the motor cut off switch adjacent thereto is opened, and the parts of the yieldable connection assume the positions disclosed in Figure 2.

It will now be assumed that the driver of the vehicle has increased its speed, and that he desires a high gear setting of the transmission 12. To this end the driver will operate the selector switch 32 to select say the contact 38; and this operation closes an electrical circuit including the then closed switch 42. The motor 30 is thus energized resulting in a rotation of the worm gear 18; and the latter operation effects, through the intermediary of the force transmitting members 84' and 54' and by means of the operation of the rack 54 and pinion 11, a compression of the spring 86a until the thrust washer 87 abuts the stop 86', followed by a compression of the spring 79, the washer 80 leaving the washer 85. In this operation of successively compressing the springs 86a and 79 the switch 42 is opened, by the operation of the cam 70 in moving the pin 56 upwardly, to cut off the operation of the motor 30; and the parts of the mechanism then in motion, including the worm gear 18 and parts connected thereto, are brought to rest by the operation of the stop spring 91, Figure 3. In this regard the spring 91 is particularly useful when there is no resistance to movement of the rod 76 a condition which would exist if the motor is brought into play after the accelerator is released; for under these conditions it is quite necessary to provide some means for stopping the movement of the motor driven parts after the switch mechanism has operated to cut off the motor.

Now it is apparent from the above description that this high gear operation of the selector switch 32 and the resulting compression of the springs 86a and 79 was effected prior to a release of the accelerator of the vehicle; for this being true the driving that is torque transmitting load to which the parts of the transmission 12 are at the time subjected, prevents a rightward movement of the rod 76 as the springs 86a and 79 are being compressed. The high gear pre-selecting operation of the mechanism having been thus completed the parts remain in the above described positions awaiting a release of the accelerator and a subsequent synchronization of the gears to be meshed, to make possible a successive expansion of the springs 79 and 86a to effect a high gear operation of the transmission.

Continuing the description of the operation of the mechanism of my invention, to effect the latter setting of the transmission the driver will release the accelerator and this operation effects the necessary torque reversal operation of the power plant of the vehicle; for when the accelerator is released the internal combustion engine 95 of the vehicle no longer serves as a prime mover to load the gears or equivalent means of the transmission and thereby prevent a demeshing operation thereof. It follows therefore that when the driver releases the accelerator the relatively heavy cocked spring 79 becomes free to expand to move the rod 76 to the right, Figure 2, to demesh the gears or their equivalent mechanism establishing the transmission in its low gear setting. The de-meshing or oft called neutralizing operation of the transmission having been completed the next step in the operation is to effect a synchronization of the gears to be meshed; and immediately after this operation is effected the transmission is, by the expansion of the spring 86a, established in its high gear setting. It is to be noted that the latter operation is, by virtue of the expansion of the relatively light spring 86a, performed quickly and quietly.

Continuing the description of the operation of the mechanism of my invention, the transmission having been established in its high gear setting, the accelerator may be operated in the usual manner to increase or maintain the speed of the vehicle. When a low gear setting of the transmission is desired the switch 32 is operated by moving the selective lever into engagement with switch contact 40 thereby completing the necessary electrical circuit to the motor 30; and as will be apparent from the preceding description, this operation, assuming it is effected prior to the release of the accelerator or disengagement of the friction clutch, will effect an energization of the motor 30 resulting in a successive cocking of the springs 86a and 79, the rod 77 moving to the left, Figure 2. As with the previously described high gear operation of the mechanism, the motor 30 is then automatically de-energized, after the cam has moved a certain distance, by an operation of the cut off switch mechanism; and the rotation, that is inertia effect, of the worm gear 18 is stopped by the operation of the spring 91. In this motor cut off operation the cam 70 moves the pin 57 to the position disclosed in Figure 2 thereby opening the cut off switch, not shown. A release of the accelerator to reverse the torque will then result in an expansion of the spring 79 to effect the desired neutralization of the transmission and this operation is followed by a depression of the accelerator to synchronize the gears to effect the low gear setting of the transmission the latter operation being effected by the expansion of the spring 86a.

In the above described operation of cocking the springs the preloaded spring 86a is further compressed until the stop 86' contacts the washer 87; and after this operation is completed the preloaded spring 79 is further compressed by the operation of the rack 54, the washer 81 leaving the locking ring 83.

There is thus provided, by the transmission operating unit 10 together with the electrical controls thereof, an effective and efficient transmission operating mechanism well adapted to quietly operate either a two speed axle of an automotive vehicle or other change speed transmission of the power plant of the vehicle. The motor unit 10, constituting the essence of my invention, includes relatively few moving parts preferably comprising a worm and worm gear mechanism driven by a double field reversible electric motor this driving mechanism being connected to the transmission by yieldable force transmitting means including two springs connected in series. With this mechanism the timed cutting out of operation of the electric motor, by the operation of the cut off switches, serves, in cooperation with the operation of the stop mechanism, to insure the desired inertia operation of the moving parts to effect the desired compression of the springs 79 and 86a; and with the mechanism of my invention the operation of the yieldable force transmitting means, positioned between the worm and worm gear mechanism and the transmission, insures a relatively quiet operation of the transmission.

Although only one embodiment has been illustrated and described, various changes in the form and relative arrangements of the parts may be made to suit requirements.

I claim:

1. A power unit for moving a control element from one to the other of two operative positions comprising a reversible motor, a force transmitting member driven thereby and drivably engaging another force transmitting member, and a two-way force transmitting connection between the second mentioned force transmitting member and control element including a plurality of springs connected in series with each other and energized to move the element to one of its operative positions upon rotation of the motor in one direction and to its other operative position upon rotation of the motor in the other direction.

2. A power unit for moving a control element from one to the other of two operative positions comprising a double acting motor, means for controlling the operation of the motor, force transmitting means, including a plurality of series connected springs, connected to the motor and energized upon energization of the motor, a motor shut-off switch mechanism actuated by the motor and a connection from one of the springs to the control element whereby the spring, when energized, will move the element to one of its operative positions when the force resisting such motion is reduced to a value less than that of the energized spring.

3. In a driving mechanism adapted to be incorporated in the drive system of an automotive vehicle, the combination with a change speed transmission including mechanism adapted to be established in at least two settings, of power means for successively operating the transmission to establish first one and then the other of the latter settings including a double acting motor, force transmitting means interconnecting the motor and transmission including two series connected yieldable members operable to make possible an operation of the motor, without injury thereto, prior to either a demeshing or remeshing of the transmission, one of said two springs being compressed prior to a compression of the other spring and being operable to facilitate a quiet re-meshing operation of the transmission; together with means for controlling the operation of the motor.

4. In a driving mechanism adapted to be incorporated in the drive system of an automotive vehicle, the combination with a change speed transmission including mechanism adapted to be established in at least two settings, of power means for successively operating the transmission to establish first one and then the other of the latter two settings including a double acting motor, force transmitting means interconnecting the motor and transmission including a plurality of yieldable means operable to make possible an operation of the motor, without injury thereto, prior to either a de-meshing or re-meshing operation, and further operable to facilitate a quiet re-meshing operation of the transmission; together with means for controlling the operation of the motor including a cut off switch mechanism automatically operative, after a part of the force transmitting means has moved a certain distance, to cut off the operation of said motor.

5. In a driving mechanism adapted to be incorporated in the drive system of an automotive vehicle, the combination with a change speed transmission including means adapted to be established in at least two settings, of power means for successively operating the transmission to establish first one and then the other of the latter settings including a double acting motor comprising a power element, force transmitting means interconnecting the power element and transmission including successively operable springs connected in series and force transmitting means being operable to make possible an operation of the motor, without injury thereto, prior to either a de-meshing or a re-meshing operation of the transmission and further operative to facilitate a quiet re-meshing operation of the transmission, means for controlling the operation of the motor including a selector switch mechanism operative to initiate the operation of the motor and further including a cut off switch mechanism automatically operative, after a part of the force transmitting means has moved a certain distance, to cut off the operation of said motor; together with stop means operative to limit the rotation of the power element of the motor after the cut off switch mechanism operates to de-energize the motor.

6. A power unit adaptable to operate a change speed transmission of an automotive vehicle including a motor comprising a drive shaft, a worm and worm gear unit operably connected to said shaft, a transmission operating rod mounted in the casing of the unit, and force transmitting means interconnecting the rod and worm gear including a rack and pinion connection and further including a plurality of preloaded and successively operable springs connected in series with each other, said springs being stressed when the motor is energized to effect an operation of the unit.

7. A power unit adapted to operate a change speed transmission of an automotive vehicle said unit including an electric motor having a shaft, a casing, means within the casing comprising a worm and worm gear driven mechanism drivably connected to said shaft, a transmission operating rod, force transmitting means interconnecting the rod and worm gear including a rack and pinion connection and further including a plurality of successively operable springs connected in series with each other, said springs being energized when the motor is energized to effect an operation of the unit; cut off switch mechanism for controlling the operation of the motor to limit the degree of energization of the spring, and means connected to the rack for operating the switch mechanism.

8. A power unit adaptable to operate a change speed transmission of an automotive vehicle including an electric motor comprising a drive shaft, a worm and worm wheel driven mechanism drivably connected to said shaft, a transmission operating rod mounted in the casing of the unit, force transmitting means interconnecting the rod and gear wheel including a rack and pinion connection and further including a plurality of successively operable springs connected in series with each other, said springs interconnecting the rack and rod and being energized when the motor is energized to effect an operation of the unit, cut off switch mechanism for controlling the operation of the motor to limit the degree of energization of the spring, means connected to the rack for operating the switch mechanism, and stop means, including a part mounted on the worm gear, for limiting the movement of said gear wheel and the parts connected thereto, after the switch mechanism has operated to de-energize the motor.

9. A power unit adaptable to operate a two speed axle transmission of an automotive vehicle including, in combination, a double acting motor, force transmitting means connected to the power element of the motor, a transmission operating rod, two separate double acting force transmitting means interconnecting the force transmitting means and rod including two successively operable springs which are compressed when the motor is energized, a motor operated cut off switch mechanism for in part controlling the operation of the motor to limit the degree of compression of one of said springs, and means, operable by one of the two double acting force transmitting means, for operating the switch mechanism.

10. A power unit adaptable to operate a change speed transmission including a motor comprising a drive shaft, force transmitting means, including a rack and pinion, operably connected to the power element of the motor, cut off switch mechanism, actuated by the rack, for controlling the operation of the motor, a transmission operating rod, and force transmitting means interconnecting the rod and rack including two springs both of which are compressed, by an operation of the motor, to condition the same for a subsequent transmission operating operation of the rod.

11. A power unit adaptable to operate a change gear transmission including a double acting motor comprising a power, that is, driving element, force transmitting means connected to the latter element, a transmission operating rod, and force transmitting means interconnecting the rod and aforementioned force transmitting means including two successively operable springs connected in series with each other, one of said springs being weaker than the other and accordingly adapted to be cocked first when the motor is energized and serving, after the other and heavier spring has effected a demeshing operation of the transmission, to effect a relatively quiet remeshing, that is, gear establishing operation thereof.

12. A power unit adaptable to operate a change gear transmission including a double acting motor comprising a casing and a power element, force transmitting means connected to the latter element, a transmission operating rod, and force transmitting means interconnecting the rod and aforementioned force transmitting means including two springs connected in series with each other, one of said springs being weaker than the other and accordingly adapted to be cocked first when the motor is energized and serving, after the other and heavier spring has effected a demeshing operation of the transmission, to effect a relatively quiet remeshing, that is, gear establishing operation thereof; together with means for automatically cutting off the motor after a part of the latter force transmitting means has moved a certain distance, and means, including a yieldable member connected to the motor casing and a member connected to the first mentioned force transmitting means, for absorbing the kinetic energy of the moving parts of the motor and parts connected thereof, after the aforementioned cut off operation of the motor.

13. A preassembled unit for use in the transmission operating mechanism of an automotive vehicle comprising a casing, a motor housed within the casing, a worm gear and a worm mechanism housed within the casing the worm being drivably connected to the drive shaft of the motor, a motor controlling cut off control mechanism within the casing, a rod slidably mounted in the casing, force transmitting means, including yieldable means and means for operating the control mechanism, interconnecting the rod and worm gear and stop means housed within the casing and operable to limit the inertia movement of the worm gear and parts connected thereto after the control mechanism is operative to de-energize the motor said stop means including a plurality of members fixed to the casing, a coil spring mounted on one of said members and having one of its ends abutting one of said members and the other of its ends abutting another of said members, together with a pin connected to the worm gear and adapted to abut one or the other of the ends of the spring in the operation of stressing the spring as it serves as a stop member.

MAXWELL L. CRIPE.

References Cited in the file of this patent

UNITED STATES PATENTS

| Number | Name | Date |
|---|---|---|
| 1,268,264 | Murray | June 4, 1918 |
| 2,013,388 | Lacey | Sept. 3, 1935 |
| 2,426,234 | Neracher et al. | Aug. 26, 1947 |
| 2,462,779 | Russell | Feb. 22, 1949 |